(12) United States Patent
Bowerman et al.

(10) Patent No.: US 6,173,094 B1
(45) Date of Patent: Jan. 9, 2001

(54) OPTICAL-TRANSMISSION SYSTEM HAVING A SPLIT-GAIN AMPLIFIER AND A SIGNAL-MODIFYING DEVICE

(75) Inventors: John E. Bowerman; Jeffrey W. Grissom; Robert J. Walker, all of Corning, NY (US)

(73) Assignee: Corning Incorporated, Corning, NY (US)

(*) Notice: Under 35 U.S.C. 154(b), the term of this patent shall be extended for 0 days.

(21) Appl. No.: 09/274,681

(22) Filed: Mar. 24, 1999

Related U.S. Application Data

(60) Provisional application No. 60/079,353, filed on Mar. 25, 1998.

(51) Int. Cl.[7] ............................................. G02B 6/28
(52) U.S. Cl. ............................ 385/24; 359/161; 359/173; 359/333
(58) Field of Search .............................. 385/11, 15, 16, 385/24, 123, 124; 359/115, 123, 124, 127, 128, 161, 173, 333, 341

(56) References Cited

U.S. PATENT DOCUMENTS

| | | | |
|---|---|---|---|
| 5,357,359 | * 10/1994 | Uchiyama et al. | 359/123 |
| 5,361,319 | 11/1994 | Antos et al. | 385/123 |
| 5,452,124 | 9/1995 | Baker | 359/341 |
| 5,555,340 | 9/1996 | Onishi et al. | 385/127 |
| 5,675,429 | 10/1997 | Henmi et al. | 359/179 |
| 5,808,789 | * 9/1998 | Edagawa et al. | 359/341 |
| 5,815,308 | * 9/1998 | Kim et al. | 359/341 |
| 5,850,492 | * 12/1998 | Morasca et al. | 385/11 |
| 5,875,054 | * 2/1999 | Onoda et al. | 359/341 |
| 5,940,208 | * 8/1999 | Blaszyk et al. | 359/341 |

FOREIGN PATENT DOCUMENTS

WO97/50203  12/1997  (WO).

OTHER PUBLICATIONS

Pushing the Limits of Real–World Optical Networks, Nortel's Technology, Friday, Jun. 26, 1998, Nortel, Northern Telecom, 6 pp.

Pushing the Limits of Real–World Optical Networks, Nortel's Technology, Monday, Oct. 19, 1998, Nortel Networks, 6 pp.

Optical Amplifiers—A full range of integrated optical amplifier options to extend the reach of OC–48 and OC–192 systems —and increase capacity up to 320 Gbps, Nortel Networks: Optical Networking/Transport—Optical Amplifiers, http://www.1.nortelworks.com/broadband/transport/52k0800_1.html (Mar. 19, 1999).

Advanced Optical Networking Solutions for Global High–Capacity Transport Applications, Nortel Networks Product/Service Info, 56088.16/11–98 Issue 2, Nov. 10, 1998.

Dispersion Compensating Modules, Specialty Fiber Devices, Lucent Technologies, Bell Labs Innovations, PS–17 50/B22 DK–modules, May 1997.

(List continued on next page.)

*Primary Examiner*—John D. Lee
(74) *Attorney, Agent, or Firm*—Edward F. Murphy; Timothy R. Krogh

(57) ABSTRACT

An optical-transmission system includes a split-gain amplifier, a first connector device, a second connector device, and a signal-modifying device. The split-gain amplifier has a first gain stage optically connected to a first set of at least two waveguide paths and a second gain stage optically connected to a second set of at least two waveguide paths. The first connector device optically connects the at least two waveguide paths of the first set to a first combined-waveguide path. The second connector device optically connects the at least two waveguide paths of the second set to a second combined-waveguide path. The signal-modifying device is optically connected to the first and second combined-waveguide paths.

48 Claims, 3 Drawing Sheets

OTHER PUBLICATIONS

Dispersion Compensator Module, Developmental Product, Corning Components Product Information, Issued Feb. 1996, 1996, 5 pp.

*DCM Modules*, Product Family, Corning Incorporated Product Information, Issued Feb. 1998, 1998, 3 pp.

*Fiber Optics News*, Phillips, Feb. 16, 1998, Washington, D.C., www. TelcomWeb.com.

*Bandpass Wavelength Division Multiplexer*, Active/Passive Components, http://www.e-tek.com/appz/bwdm.html (Mar. 24, 1998).

*Wavelength Division Multiplexers (WDM), Bandpass Wavelength Division Multiplexers (BWDM)*, http://www.e-tek.com/prodinfo/wdm.html (Mar. 24, 1998).

*Active/Passive Components*, http://www.e-tek.com/prodinfo/apc.html (Mar. 24, 1998).

*Combined/Integrated Optics*, http://www.e-tek.com/prodinfo.cio.html (Mar. 24, 1998).

*JDS Fitel, FiberOptic Components, Instrumentation, Outside Plant Installation Products*, Product Catalog, http://www.jdsfitel.com/testcat/comptrame.html#wdm (Mar. 24, 1998).

*FiberGain™063 Module*, Corning Incorporated, Product Information, P17331, Issued Dec. 1997.

Corning ®MultiClad ™ 1×8 Couplers, Corning Incorporated Product Information, P1800, Issued Feb. 1998.

*Device and Method to Suppress Q–Switching in an Optical Amplifying Device*, U.S. Patent application No. 08/878,262, filed Jun. 18, 1997, U.S. Patent 5,801,879, issued Sep. 1, 1998.

\* cited by examiner

OPTICAL-TRANSMISSION SYSTEM HAVING A SPLIT-GAIN AMPLIFIER AND A SIGNAL-MODIFYING DEVICE

RELATED APPLICATIONS

This application claims priority to U.S. application Ser. No. 60/079,353, filed on Mar. 25, 1998, the contents of which are herein incorporated by reference.

FIELD OF THE INVENTION

The present invention relates to an optical-transmission system. More specifically, the present invention relates to an optical-transmission system including a split-gain amplifier and a signal-modifying device connected within the amplifier.

DESCRIPTION OF THE RELATED ART

In telecommunications, optical signals can be transmitted over a long distance by a multi-wavelength optical-repeater system ("optical-repeater system"). FIG. 3 illustrates a bidirectional optical-repeater system 10.

In the optical-repeater system 10, optical signals propagating in a first direction through optical waveguide fibers ("optical fibers") 12 are combined by a multiplexer 14 for transmission through optical fibers 16 to a demultiplexer 18, which separates the optical signals onto optical fibers 20. Amplifiers 30 amplify the optical signals to provide the strength required for propagation over the optical fibers 16, which can be eighty kilometers or even longer. The optical-repeater system 10 permits bi-directional transmission (i.e., optical signals traveling in a second direction through optical fibers 16) by providing optical fibers 12', a multiplexer 14', a demultiplexer 18', optical fibers 20', and band splitters 22 that combine and separate optical signals according to their direction of propagation.

Many currently used optical-repeater systems transmit optical signals in the 1550 nanometer band (1525 to 1570 nanometers) because, for example, this band provides low attenuation and the optical amplifiers (erbium doped fiber amplifiers) used for this band have economic efficiency and performance advantages. Some of these optical-repeater systems, however, were created by using optical fibers 16 already installed in the ground as part of old electronic-repeater systems, which were designed to transmit optical signals in the 1300 nanometer band (1270 to 1330 nanometers). These optical fibers 16 have approximately zero dispersion only in the 1300 nanometer band. Therefore, the optical-repeater systems are transmitting optical signals in the 1550 nanometer band through optical fibers that do not have zero dispersion in that band. Optical-repeater systems can be utilized to transmit optical signals in the L-band (1570 to 1625 nm) in addition to the C-band (1525 to 1570 nm). Additionally, optical-repeater systems can be used to transmit optical signals in the Short-band (1290–1525 nm) and the Preferred Short-band (1330–1525 nm).

Transmitting optical signals in this manner causes degradation of the optical signal due to chromatic dispersion. More specifically, since the optical fibers 16 do not have zero dispersion in the 1550 nanometer band, different wavelengths of light in a pulse will tend to spread out as the pulse propagates along the optical fibers 16.

Consequently, the optical-repeater system 10 includes dispersion-compensating devices 40 that compensate for chromatic dispersion. The dispersion-compensating devices 40 have a relatively high zero dispersion wavelength so that the average zero dispersion wavelength of the optical-repeater system 10 is within the 1550 nanometer band. For example, if the zero dispersion wavelength of the optical fibers 16 is 1300 nanometers, the zero dispersion wavelength for each of the dispersion-compensating devices 40 will be above 1550 nanometers (for example, 1700 nanometers) so that the optical-repeater system 10 has an average zero dispersion wavelength in the 1550 nanometer band.

The dispersion-compensating devices 40, however, cause a loss in the strength of the optical signals propagating through the optical-repeater system 10. Thus, additional amplifiers 30 must be included to compensate for this loss. In FIG. 3, one of every two amplifiers 30 connected to a dispersion-compensating device 40 is required merely due to the loss caused by the dispersion-compensating device 40.

SUMMARY OF THE INVENTION

An object of the present invention is to provide an optical-transmission system that compensates for chromatic dispersion without causing excessive power losses.

Another object of the invention is to provide an optical-transmission system that compensates for chromatic dispersion while minimizing the cost of the system.

Additional objects and advantages of the invention may be apparent from the description that follows. Further advantages of the invention also may be learned by practice of the invention.

To achieve the objects and in accordance with the purpose of the invention, as embodied and broadly described herein, the invention comprises an optical-transmission system including a split-gain amplifier having a first gain stage optically connected to a first set of at least two waveguide paths and a second gain stage optically connected to a second set of at least two waveguide paths, a first connector device that optically connects the at least two waveguide paths of the first set to a first combined-waveguide path, a second connector device that optically connects the at least two waveguide paths of the second set to a second combined-waveguide path, and a signal-modifying device optically connected to the first and second combined-waveguide paths.

It is to be understood that the foregoing general description and the following detailed description are exemplary and explanatory only and are not restrictive of the invention as claimed.

BRIEF DESCRIPTION OF THE DRAWINGS

The accompanying drawings illustrate embodiments of the invention and together with the description serve to explain the principles of the invention.

DETAILED DESCRIPTION OF THE PREFERRED EMBODIMENTS

Reference will now be made in detail to the presently preferred embodiments of the invention. Wherever possible, the same reference numbers will be used throughout the drawings to refer to the same or like parts.

Figure 1:
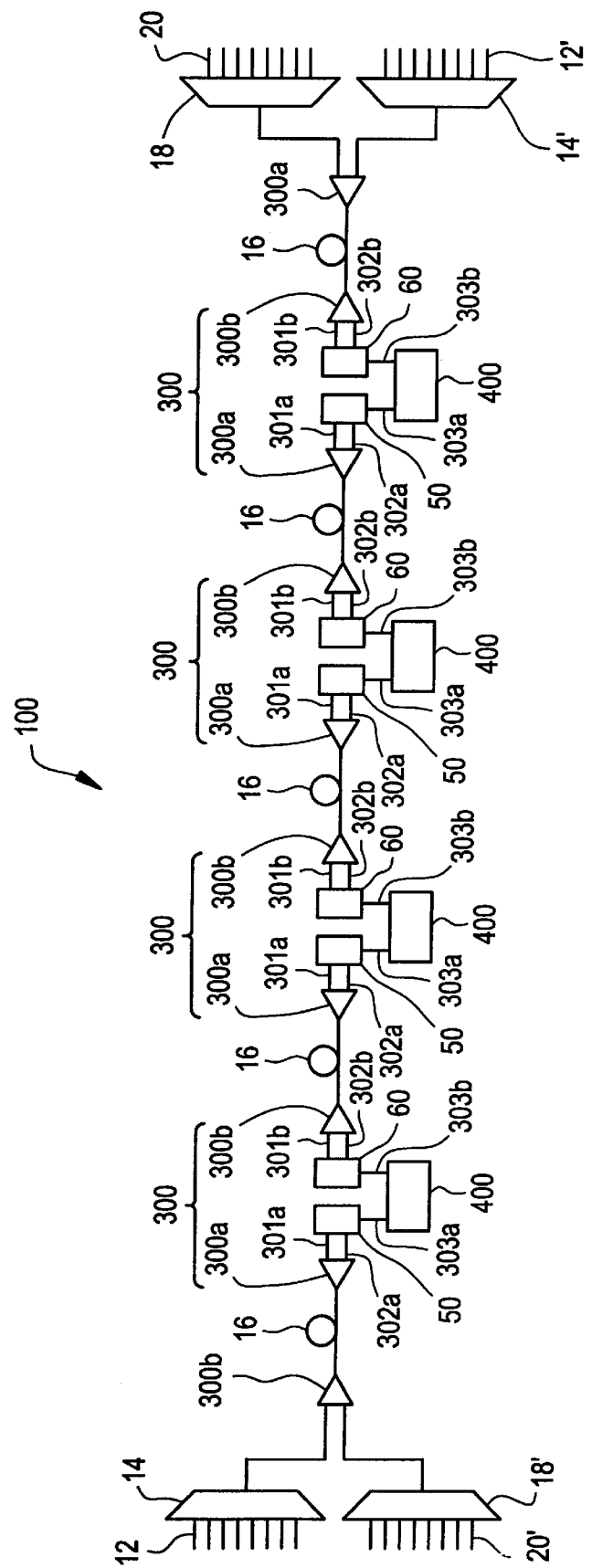
FIG. 1 shows a first embodiment of an optical-transmission system according the present invention.

As shown in FIG. 1, the first embodiment of an optical-transmission system 100 includes many of the same elements as the conventional optical-repeater system 10 described above. For example, the optical-transmission system 100 includes optical fibers 12 and 12' that transmit optical signals generated by optical transmitters (not shown). The optical signals are combined by multiplexers 14 and 14' for transmission through optical fibers 16 to demultiplexers 18 and 18', which separate the optical signals onto optical fibers 20 and 20'. Optical receivers (not shown) receive the optical signals transmitted by the optical fibers 20 and 20'.

The multiplexers 14 and 14' and the demultiplexers 18 and 18' are each preferably a thin film interference wavelength division device. Such a device includes a series of thin film filters that each reflect a different portion of a wide band (e.g., 1525 to 1570 nanometers) and transmit the remainder. The filters are optically coupled together to split the wide band into two or more (preferably eight) smaller bands, each of a predetermined wavelength range. The device operates in the opposite direction to combine the separated portions of the band to provide the wide band. This device can be ordered to specification from JDSFITEL, Inc. of Ontario, Canada. A less preferred multiplexer and demultiplexer is, for example, Corning Incorporated MULTI-CLAD 1×8 Coupler No. 1X8SW1550A.

In contrast to the amplifier/dispersion-compensating device/amplifier configuration of the optical-repeater system 10, the optical-transmission system 100 of the present invention includes a split-gain amplifier 300, a first connector device 50, a second connector device 60, and a dispersion-compensating device (signal-modifying device) 400.

The split-gain amplifier 300 amplifies signals propagating through the optical fibers 16 in a first direction (e.g., rightward in FIG. 1) and a second direction (leftward). The split-gain amplifier 300 has a first gain stage 300a and a second gain stage 300b. The first gain stage 300a preferably includes a combined pre- and post-amplifier portion that provides pre-amplification for optical signals propagating in the first direction and post-amplification for optical signals propagating in the second direction. The second gain stage 300b preferably includes a combined pre-and post-amplifier portion that provides pre-amplification for optical signals propagating in the second direction and post-amplification for optical signals propagating in the first direction.

The first gain stage 300a is optically connected to a first set of waveguide paths 301a and 302a. The second gain stage 300b is optically connected to a second set of waveguide paths 301b and 302b. The split-gain amplifier 300 preferably separates the optical signals such that the waveguide paths 301a and 301b transmit only optical signals propagating in the first direction and the waveguide paths 302a and 302b transmit only optical signals propagating in the second direction. Presently, it is preferred that split-gain amplifier achieve this separation based on the wavelengths of the optical signals, since current amplified optical-transmission systems do not transmit the same wavelength in both the first and second directions.

A preferred split-gain amplifier having the above-mentioned characteristics is a bidirectional amplifier with mid-stage access that is available from Northern Telecom, under the brand name MOR Plus. The current MOR Plus brand bi-directional amplifier with mid-stage access utilizes two dispersion compensating devices.

The first connector device 50 optically connects the waveguide paths 301a and 302a to a first combined-waveguide path 303a. Preferably, the first connector device 50 guides optical signals propagating in the first direction from the waveguide path 301a to the first combined-waveguide path 303a. It also guides optical signals propagating in the second direction from the first combined-waveguide path 303a to the waveguide path 302a.

The second connector device 60 optically connects the waveguide paths 301b and 302b to a second combined-waveguide path 303b. Preferably, the second connector device 60 guides optical signals propagating in the first direction from the second combined-waveguide path 303b to the waveguide path 301b. It also guides optical signals propagating in the second direction from the waveguide path 302b to the second combined-waveguide path 303b.

Connector devices that will perform the functions described above include, for example, the thin film interference wavelength division device described above, which is also known as a band splitter. For use as a connector device, it is preferred that the band splitter split a wide band (for example, 1530 to 1560 nanometers) into only the red portion (long wavelengths, such as 1542 to 1560 nanometers) and the blue portion (short wavelengths, such as 1530 to 1542 nanometers), and also combine the portions to provide the wide band. This device can be ordered to specification from E-TEK Dynamics, Inc. of San Jose, Calif. Another preferred connector device is a circulator, such as CR 2300/2500 Series Optical Circulators sold by JDSFITEL Inc. or PIFC sold by E-TEK Dynamics, Inc.

The waveguide paths 301a, 302a, 301b, and 302b and the first and second combined-waveguide paths 303a and 303b have been shown as somewhat elongated for ease of illustration. However, the paths are not limited to being elongated.

The dispersion-compensating device 400 is optically connected to the first and second combined-waveguide paths 303a and 303b and thus receives the optical signals propagating through the optical fibers 16. The optical-transmission system 100 preferably accomplishes dispersion compensation by using only a single dispersion-compensating device 400 for each split-gain amplifier 300. Dispersion-compensating devices are particularly well suited for this configuration because they can be bidirectional and provide the same signal modification irrespective of the direction of propagation of the optical signal.

The dispersion-compensating device preferably has a positive or a negative slope of dispersion versus wavelength and, more preferably, has a negative slope. The dispersion-compensating device is preferably comprised of a length (preferably 4 to 20 kilometers, more preferably 12 to 16 kilometers) of dispersion-compensating optical fiber wound around a spool. The dispersion-compensating optical fiber preferably has a dispersion value less than −20 picoseconds/nanometer-kilometer at a given wavelength within a range from 1520 nanometers to 1565 nanometers, preferably in the range of 1520–1625 nm. Such a device is disclosed, for example, in U.S. Pat. No. 5,361,319 to Antos et al., which is hereby incorporated by reference.

A dispersion-compensating device 400 having the characteristics mentioned above is, for example, Corning Incorporated's Corning DCM® Module DCM-B-80.

The optical-transmission system 100 also includes a combined pre- and post-amplifier portion 300b and a combined pre- and post-amplifier portion 300a that optically connect the optical fibers 16 to the multiplexers 14 and 14' and demultiplexers 18 and 18'. In this embodiment, the combined pre- and post-amplifier portion 300b guides optical signals from the multiplexer 14 to the optical fiber 16 and guides optical signals from the optical fiber 16 to the demultiplexer 18'. The combined pre- and post-amplifier portion 300*a* guides optical signals from the optical fiber 16 to the demultiplexer 18 and guides optical signals from the multiplexer 14' to the optical fiber 16. Each of the combined pre- and post-amplifier portions 300*b* and 300*a* provides pre-amplification for optical signals propagating in one direction and post-amplification to optical signals propagating in the other direction to overcome loss caused by the optical fiber, multiplexers, and demultiplexers.

Figure 2:
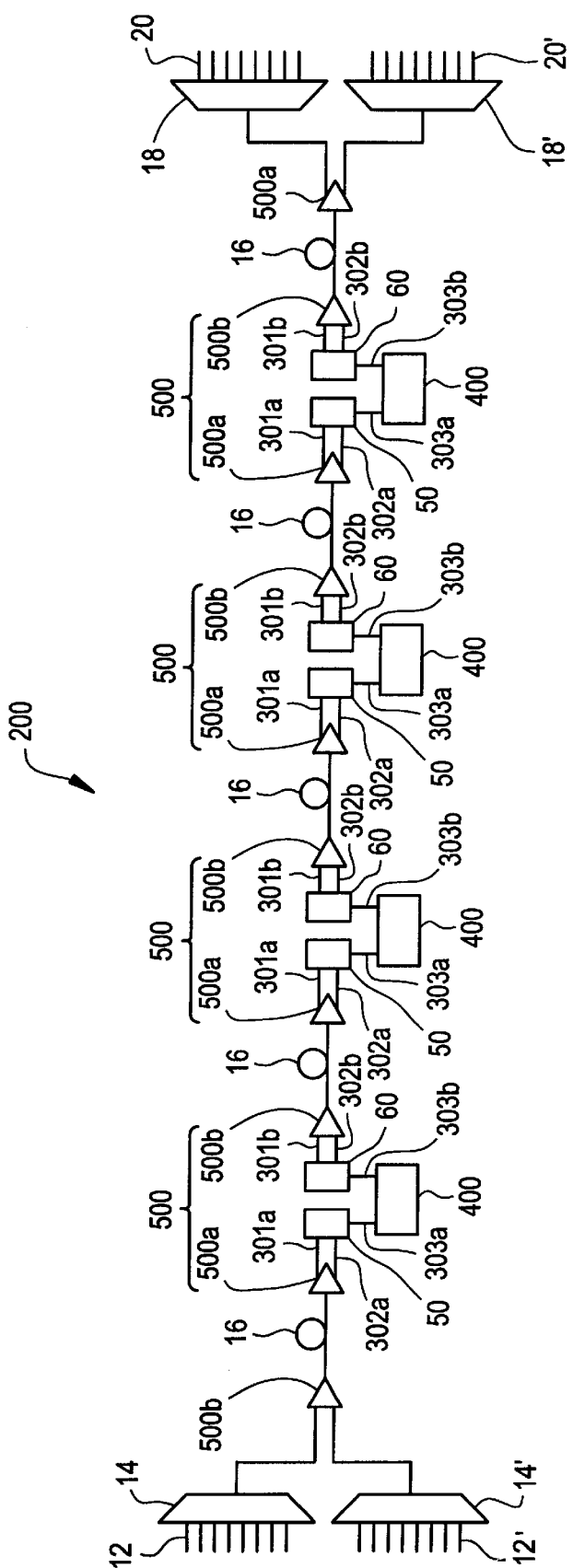
FIG. 2 shows a second embodiment of an optical-transmission system according the present invention.
Figure 3:
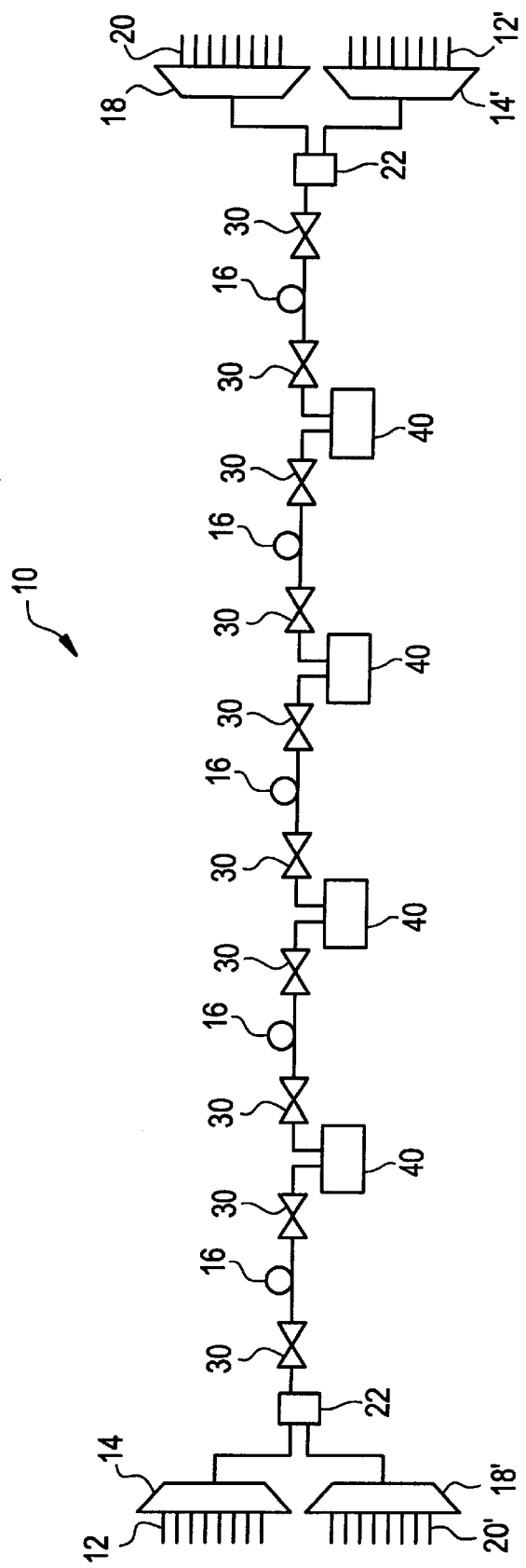
FIG. 3 shows a conventional optical-repeater system.

The optical-transmission system 200 of the second embodiment, as shown in FIG. 2, shares many components with the first embodiment. In this second embodiment, however, the optical-transmission system is unidirectional.

The split-gain amplifier 500 amplifies signals propagating through the optical fibers 16 only in a first direction (e.g., rightward in FIG. 2). The split-gain amplifier 500 receives optical signals having a plurality of wavelengths and separates the optical signals based on their wavelengths. A pre-amplifier portion 500*a* of the split-gain amplifier 500 preferably separates the optical signals such that the waveguide paths 301*a* and 301*b* transmit optical signals having a predetermined wavelength or range of wavelengths and the waveguide paths 302*a* and 302*b* transmit optical signals having a different predetermined wavelength or range of wavelengths. A post-amplifier portion 500*b* of the split-gain amplifier 500 preferably recombines the optical signals. A preferred split-gain amplifier having the above-mentioned characteristics is a unidirectional amplifier with mid-stage access available from Lucent Technologies under the name WAVESTAR™.

The first connector device 50 optically connects the waveguide paths 301*a* and 302*a* to the first combined-waveguide path 303*a*. Preferably, the first connector device 50 guides optical signals having the predetermined wavelength or range of wavelengths from the waveguide path 301*a* to the first combined-waveguide path 303*a*. It also guides optical signals having the different predetermined wavelength or range of wavelengths from the waveguide path 302*a* to the first combined-waveguide path 303*a*.

The second connector device 60 optically connects the waveguide paths 301*b* and 302*b* to the second combined-waveguide path 303*b*. Preferably, the second connector device 60 guides optical signals having the predetermined wavelength or range of wavelengths from the second combined-waveguide path 303*b* to the waveguide path 301*b*. It also guides optical signals having the different predetermined wavelength or range of wavelengths from the second combined-waveguide path 303*b* to the waveguide path 302*b*.

Presently preferred connector devices that will perform the functions described above include, for example, the thin film interference wavelength division device (band splitter) and circulator described above.

The optical-transmission system 200 preferably accomplishes dispersion compensation by using only a single dispersion-compensating device 400 for each split-gain amplifier 500. The dispersion-compensating device 400 is optically connected to the first and second combined-waveguide paths 303*a* and 303*b* and thus receives the optical signals propagating unidirectionally through the optical fibers 16. A dispersion-compensating device 400 that can perform the above-mentioned function is, for example, Corning Incorporated's Corning DCM® Module DCM-B-80.

The optical-transmission system 200 also includes a post-amplifier portion 500*b* and a pre-amplifier portion 500*a* that optically connect the optical fibers 16 to the multiplexers 14 and 14' and demultiplexers 18 and 18', respectively. In this embodiment, the post-amplifier portion 500*b* combines signals received from multiplexers 14 and 14' and provides them to the optical fiber 16. The pre-amplifier portion 500*a* also separates the optical signals received from the optical fiber 16 based on their wavelengths and provides them to the appropriate demultiplexer 18 and 18'. The post-amplifier and pre-amplifier portions 500*b* and 500*a* provide amplification to overcome the loss caused by the optical fibers and the multiplexers and demultiplexers.

Through computer modeling, it has been determined that the optical-transmission systems 100 and 200 of the present invention provide distinct advantages. For example, the optical-transmission systems 100 and 200 provide similar performance as the conventional optical-repeater system 10 and are able to achieve this while minimizing cost.

Due to the configuration of the amplifiers and dispersion-compensating devices, the optical-transmission systems 100 and 200 do not cause excessive power loss. In the conventional optical-repeater system 10, if the dispersion-compensating device 40 was connected upstream of the amplifier 30 (the linear region), the loss caused by the dispersion-compensating device 40 would result in a large loss (e.g., 10 dB) in the power output by the amplifier 30. In the present invention, however, since the dispersion-compensating device 400 is connected within the split-gain amplifier 300 and 500 (the highly saturated region), the loss caused by the dispersion-compensating device 400 results in only a small loss (e.g., 0.5 dB) in power output by the split-gain amplifier 300 and 500.

Further, the present invention minimizes the cost of the optical-transmission system. The split-gain amplifier 300 and 500 divides the optical signals propagating in the optical fibers 16 into multiple waveguide paths. The present invention does not, however, provide a dispersion-compensating device 400 on each of the waveguide paths. The present invention instead uses the connectors 50 and 60 so that the optical signals can be routed to a single dispersion-compensating device 400. This reduces the expense associated with dispersion-compensating devices by at least fifty percent, which is significant since dispersion-compensating devices are costly components.

It will be apparent to those skilled in the art that various modifications and variations can be made in the optical-transmission system of the present invention without departing from the scope or spirit of the invention. As an example, the split-gain amplifiers could have more than two waveguide paths in each set. As a further example, the split-gain amplifiers could have more than two gain stages. As yet a further example, the signal-modifying device need not be a dispersion-compensating device, but could be another optical component that modifies an optical signal. The signal-modifying device also can be designed to fit the needs of a particular system and, therefore, does not have to provide the same signal modification in the both directions (the first embodiment) or for all wavelengths (the second embodiment).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical-transmission system comprising:
   a split-gain amplifier having a first gain stage optically connected to a first set of at least two waveguide paths and a second gain stage optically connected to a second set of at least two waveguide paths;
   a first connector device that optically connects the at least two waveguide paths of the first set to a first combined-waveguide path;
   a second connector device that optically connects the at least two waveguide paths of the second set to a second combined-waveguide path; and
   a signal-modifying device having a dispersion compensating device, said signal modifying device optically connected to the first and second combined-waveguide paths.

2. The optical-transmission system of claim 1, wherein the split-gain amplifier receives optical signals propagating in first and second directions and separates the optical signals such that one of the at least two waveguide paths in each of the first and second sets transmits only optical signals propagating in the first direction and the other of the at least two waveguide paths in each of the first and second sets transmits only optical signals propagating in the second direction.

3. The optical-transmission system of claim 2, wherein the first connector device guides optical signals propagating in the first direction from said one waveguide path in the first set to the first combined-waveguide path and guides optical signals propagating in the second direction from the first combined-waveguide path to said other waveguide path in the first set.

4. The optical-transmission system of claim 2, wherein the second connector device guides optical signals propagating in the first direction from the second combined-waveguide path to said one waveguide path in the second set and guides optical signals propagating in the second direction from said other waveguide path in the second set to the second combined-waveguide path.

5. The optical-transmission system of claim 1, wherein the split-gain amplifier receives optical signals having a plurality of wavelengths and separates the optical signals such that one of the at least two waveguide paths in each of the first and second sets transmits optical signals having at least one wavelength and the other of the at least two waveguide paths in each of the first and second sets transmits only optical signals that do not have said at least one wavelength.

6. The optical-transmission system of claim 5, wherein the first connector device guides optical signals having said at least one wavelength from said one waveguide path in the first set to the first combined-waveguide path and guides optical signals that do not have said at least one wavelength from said other waveguide path in the first set to the first combined-waveguide path.

7. The optical-transmission system of claim 5, wherein the second connector device guides optical signals having said at least one wavelength from the second combined-waveguide path to said one waveguide path in the second set and guides optical signals that do not have said at least one wavelength from the second combined-waveguide path to said other waveguide path in the second set.

8. The optical-transmission system of claim 1, wherein the first connector device includes a band splitter.

9. The optical-transmission system of claim 1, wherein the first connector device includes a circulator.

10. The optical-transmission system of claim 1, wherein the second connector device includes a band splitter.

11. The optical-transmission system of claim 1, wherein the second connector device includes a circulator.

12. An optical waveguide device comprising:
    a wound length of dispersion compensating optical fiber having a first end and a second end,
    a first connector, said first connector for splitting a wide band of wavelengths into a red portion and a blue portion, and combining the red portion and the blue portion to provide the wide band,
    a second connector, different from said first connector, said second connector for splitting the wide band of wavelengths into the red portion and the blue portion, and combining the red portion and the blue portion to provide the wide band,
    said first connector connected to said first end of said dispersion compensating optical fiber and said second connector connected to said second end of said dispersion compensating optical fiber.

13. An optical-amplifier module comprising:
    a split-gain amplifier having a first gain stage optically connected to a first set of at least two waveguide paths and a second gain stage optically connected to a second set of at least two waveguide paths;
    a first connector device that optically connects the at least two waveguide paths of the first set to a first combined-waveguide path;
    a second connector device that optically connects the at least two waveguide paths of the second set to a second combined-waveguide path; and
    a signal-modifying device having a dispersion compensating device, said signal modifying device optically connected to the first and second combined-waveguide paths.

14. The optical-amplifier module of claim 13, wherein the split-gain amplifier receives optical signals propagating in first and second directions and separates the optical signals such that one of the at least two waveguide paths in each of the first and second sets transmits only optical signals propagating in the first direction and the other of the at least two waveguide paths in each of the first and second sets transmits only optical signals propagating in the second direction.

15. The optical-amplifier module of claim 14, wherein the first connector device guides optical signals propagating in the first direction from said one waveguide path in the first set to the first combined-waveguide path and guides optical signals propagating in the second direction from the first combined-waveguide path to said other waveguide path in the first set.

16. The optical-amplifier module of claim 14, wherein the second connector device guides optical signals propagating in the first direction from the second combined-waveguide path to said one waveguide path in the second set and guides optical signals propagating in the second direction from said other waveguide path in the second set to the second combined-waveguide path.

17. The optical-amplifier module of claim 13, wherein the split-gain amplifier receives optical signals having a plurality of wavelengths and separates the optical signals such that one of the at least two waveguide paths in each of the first and second sets transmits optical signals having at least one wavelength and the other of the at least two waveguide paths in each of the first and second sets transmits only optical signals that do not have said at least one wavelength.

18. The optical-amplifier module of claim 17, wherein the first connector device guides optical signals having said at least one wavelength from said one waveguide path in the first set to the first combined-waveguide path and guides optical signals that do not have said at least one wavelength from said other waveguide path in the first set to the first combined-waveguide path.

19. The optical-amplifier module of claim 17, wherein the second connector device guides optical signals having said at least one wavelength from the second combined-waveguide path to said one waveguide path in the second set and guides optical signals that do not have said at least one wavelength from the second combined-waveguide path to said other waveguide path in the second set.

20. The optical-amplifier module of claim 13, wherein the first connector device includes a band splitter.

21. The optical-amplifier module of claim 13, wherein the first connector device includes a circulator.

22. The optical-amplifier module of claim 13, wherein the second connector device includes a band splitter.

23. The optical-amplifier module of claim 13, wherein the second connector device includes a circulator.

24. A method of making a dispersion compensating optical waveguide device comprising:
provided a wound length of dispersion compensating fiber which has a dispersion value less than −20 picoseconds/nanometer-kilometer in the range of 1520 to 1565 nm and a negative slope of dispersion value versus wavelength in the range of 1520 to 1565 nm;
connecting a first connector to a first end of said wound length of dispersion compensating fiber, said first connector for splitting a wide band of wavelengths into a red portion and a blue portion and combining the red portion and the blue portion to provide the wide band, and
connecting a second connector, different from said first connector, to a second end of said wound length of dispersion compensating fiber, said second connector for splitting a wide band of wavelengths into a red portion and a blue portion and combining the red portion and the blue portion to provide the wide band.

25. A dispersion-compensating module comprising:
a first set of at least two waveguide paths;
a second set of at least two waveguide paths;
a first connector device that optically connects the at least two waveguide paths of the first set to a first combined-waveguide path;
a second connector device that optically connects the at least two waveguide paths of the second set to a second combined-waveguide path; and
a dispersion-compensating device optically connected to the first and second combined-waveguide paths, said dispersion-compensating device having a length of dispersion-compensating optical fiber.

26. The dispersion-compensating module of claim 25, wherein one of the at least two waveguide paths in each of the first and second sets transmits only optical signals propagating in a first direction and the other of the at least two waveguide paths in each of the first and second sets transmits only optical signals propagating in a second direction.

27. The dispersion-compensating module of claim 26, wherein the first connector device guides optical signals propagating in the first direction from said one waveguide path in the first set to the first combined-waveguide path and guides optical signals propagating in the second direction from the first combined-waveguide path to said other waveguide path in the first set.

28. The dispersion-compensating module of claim 26, wherein the second connector device guides optical signals propagating in the first direction from the second combined-waveguide path to said one waveguide path in the second set and guides optical signals propagating in the second direction from said other waveguide path in the second set to the second combined-waveguide path.

29. The dispersion-compensating module of claim 25, wherein one of the at least two waveguide paths in each of the first and second sets transmits optical signals having at least one wavelength and the other of the at least two waveguide paths in each of the first and second sets transmits only optical signals that do not have said at least one wavelength.

30. The dispersion-compensating module of claim 29, wherein the first connector device guides optical signals having said at least one wavelength from said one waveguide path in the first set to the first combined-waveguide path and guides optical signals that do not have said at least one wavelength from said other waveguide path in the first set to the first combined-waveguide path.

31. The dispersion-compensating module of claim 29, wherein the second connector device guides optical signals having said at least one wavelength from the second combined-waveguide path to said one waveguide path in the second set and guides optical signals that do not have said at least one wavelength from the second combined-waveguide path to said other waveguide path in the second set.

32. The dispersion-compensating module of claim 25, wherein the first connector device includes a band splitter.

33. The dispersion-compensating module of claim 25, wherein the first connector device includes a circulator.

34. The dispersion-compensating module of claim 25, wherein the second connector device includes a band splitter.

35. The dispersion-compensating module of claim 25, wherein the second connector device includes a circulator.

36. The dispersion-compensating module of claim 25, wherein the dispersion-compensating device has a negative slope.

37. The dispersion-compensating module of claim 25, wherein said length of dispersion-compensating optical fiber has a dispersion value less than −20 picoseconds/nanometer-kilometer at a given wavelength within a range from 1520 nanometers to 1565 nanometers.

38. The dispersion-compensating module of claim 25, wherein said length of dispersion-compensating optical fiber has a dispersion value less than −20 picoseconds/nanometer-kilometer at a given wavelength within a range from 1520 nanometers to 1625 nanometers.

39. An optical waveguide chromatic dispersion compensating device for use with a wide band of wavelengths that is made up of a plurality of long wavelengths and a plurality of short wavelengths, comprising:
a length of dispersion-compensating optical fiber having a first end and a second end,
a first thin film interference wavelength division device which operates in a first direction to split said long wavelengths from said short wavelengths and operates in a second direction to combine said long wavelengths and said short wavelengths, said first thin film interference wavelength division device adjacent and connected to said first end of said dispersion-compensating optical fiber, and
a second thin film interference wavelength division device which operates in a first direction to split said long wavelengths from said short wavelengths and operates in a second direction to combine said long wavelengths and said short wavelengths, said second thin film interference wavelength division device adjacent and connected to said second end of said dispersion-compensating optical fiber.

40. An optical waveguide chromatic dispersion compensating device as claimed in claim 39 wherein the plurality of long wavelengths include light in the range from 1542 to 1560 nm and the plurality of short wavelengths include light in the range from 1530 to 1542 nm.

41. An optical waveguide chromatic dispersion compensating device as claimed in claim 39, wherein said dispersion compensating optical fiber has a negative dispersion slope.

42. An optical waveguide chromatic dispersion compensating device as claimed in claim 39 wherein the plurality of long wavelengths include light in the L-band and the plurality of short wavelengths include light in the C-band.

43. An optical waveguide chromatic dispersion compensating device as claimed in claim 39 wherein the plurality of long wavelengths include light in the C-band and the plurality of short wavelengths include light in the Short band.

44. An optical waveguide chromatic dispersion compensating device as claimed in claim 39 wherein the plurality of long wavelengths include light in the range from 1500 to 1600 nm and the plurality of short wavelengths include light in the range from 1400 to 1500 nm.

45. A method of making a dispersion compensating optical waveguide device comprising:

providing a dispersion compensating device;

connecting a first connector to a first end of said dispersion compensating device, said first connector for splitting a wide band of wavelengths into a long wavelength portion and a short wavelength portion and combining the long wavelength portion and the short wavelength portion to provide the wide band, and connecting a second connector, different from said first connector, to a second end of said dispersion compensating device, said second connector for splitting a wide band of wavelengths into a long wavelength portion and a short wavelength portion and combining the long wavelength portion and the short wavelength portion to provide the wide band.

46. A method as claimed in claim 45, wherein providing a dispersion compensating device further includes providing a wound length of dispersion compensation fiber.

47. A method as claimed in claim 46, wherein providing a wound length of dispersion compensating fiber further includes providing a dispersion compensating fiber which has a dispersion value less than −20 picoseconds/nanometer-kilometer in the range of 1520 to 1565 nm and a negative slope of dispersion value versus wavelength in the range of 1520 to 1565 nm.

48. A method as claimed in claim 46, wherein providing a wound length of dispersion compensating fiber further includes providing a dispersion compensating fiber which has a dispersion value less than −20 picoseconds/nanometer-kilometer in the range of 1520 to 1625 nm and a negative slope of dispersion value versus wavelength in the range of 1520 to 1625 nm.

\* \* \* \* \*